United States Patent
Kobayashi (10) Patent No.: US 10,893,192 B2
(45) Date of Patent: Jan. 12, 2021

(54) MOVING IMAGE PICKUP APPARATUS, MOVING IMAGE PICKUP METHOD, AND MOVING IMAGE PICKUP PROGRAM USING A THREE-DIMENSIONAL LOOKUP TABLE

(71) Applicant: JVC KENWOOD Corporation, Yokohama (JP)

(72) Inventor: Toshihide Kobayashi, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 99 days.

(21) Appl. No.: 16/245,058

(22) Filed: Jan. 10, 2019

(65) Prior Publication Data

US 2019/0297255 A1 Sep. 26, 2019

(30) Foreign Application Priority Data

Mar. 20, 2018 (JP) .................. 2018-052018

(51) Int. Cl.
| | |
|---|---|
| H04N 5/228 | (2006.01) |
| H04N 5/232 | (2006.01) |
| G06T 11/00 | (2006.01) |
| H04N 9/64 | (2006.01) |
| H04N 5/202 | (2006.01) |

(52) U.S. Cl.
CPC ....... H04N 5/23229 (2013.01); G06T 11/001 (2013.01); H04N 5/202 (2013.01); H04N 9/64 (2013.01)

(58) Field of Classification Search
CPC .......................... H04N 5/23229; G06T 11/001

USPC ....................................... 348/222.1
See application file for complete search history.

(56) References Cited

U.S. PATENT DOCUMENTS

2006/0274386 A1* 12/2006 Wakazono ............. H04N 9/735
  358/518
2013/0322753 A1* 12/2013 Lim ........................ G06T 5/50
  382/167

FOREIGN PATENT DOCUMENTS

JP  2006-339931 A  12/2006

* cited by examiner

*Primary Examiner* — Usman A Khan
(74) *Attorney, Agent, or Firm* — Procopio, Cory, Hargreaves & Savitch LLP

(57) ABSTRACT

An image pickup apparatus, including: a common processing unit including a fixed level signal generating unit configured to generate a fixed level signal that have discrete values in a color space and an address in association with each other and an image processing unit configured to perform image processing on the fixed level signal to generate grid data under the condition set by the user or the condition automatically set by the image pickup apparatus; and an individual processing unit including a three-dimensional lookup table storage unit configured to store a three-dimensional lookup table in which the address and the grid data are associated with each other and output the grid data corresponding to the address of an image pickup signal and an interpolation processing unit configured to perform interpolation processing using the grid data and the image pickup signal.

7 Claims, 5 Drawing Sheets

Fig. 2

| FIXED LEVEL SIGNAL | | | ADDRESS |
|---|---|---|---|
| B, | G, | R | B, G, R |
| 0 | 0 | 0 | 000 |
| 0 | 0 | 256 | 001 |
| 0 | 0 | 512 | 002 |
| ... | ... | ... | ... |
| 0 | 0 | 3584 | 00E |
| 0 | 0 | 3840 | 00F |
| 0 | 256 | 0 | 010 |
| 0 | 256 | 256 | 011 |
| ... | ... | ... | ... |
| 0 | 256 | 3584 | 01E |
| 0 | 256 | 3840 | 01F |
| ... | ... | ... | ... |
| 0 | 512 | 0 | 020 |
| 0 | 512 | 256 | 021 |
| ... | ... | ... | ... |
| 0 | 3840 | 3584 | 0FE |
| 0 | 3840 | 3840 | 0FF |
| 256 | 0 | 0 | 100 |
| 256 | 0 | 256 | 101 |
| ... | ... | ... | ... |
| 3840 | 3840 | 0 | FF0 |
| 3840 | 3840 | 256 | FF1 |
| ... | ... | ... | ... |
| 3840 | 3840 | 3584 | FFE |
| 3840 | 3840 | 3840 | FFF |

MOVING IMAGE PICKUP APPARATUS, MOVING IMAGE PICKUP METHOD, AND MOVING IMAGE PICKUP PROGRAM USING A THREE-DIMENSIONAL LOOKUP TABLE

CROSS REFERENCE TO RELATED APPLICATION

This application is based upon and claims the benefit of priority from Japanese patent application No. 2018-052018, filed on Mar. 20, 2018, the disclosure of which is incorporated herein in its entirety by reference.

BACKGROUND

The present disclosure relates to an image pickup apparatus, an image pickup method, and an image pickup program.

Techniques for correcting image pickup results using a three-dimensional lookup table have been developed. For example, the image pickup device disclosed in Japanese Unexamined Patent Application Publication No. 2006-339931 includes a memory that has recorded a plurality of types of data for correction to be set in a three-dimensional lookup table, a control unit for selecting one piece of data for correction and setting the selected data in the three-dimensional lookup table, and an image processing unit for color-adjusting an image pickup result using the three-dimensional lookup table.

SUMMARY

In the image pickup apparatus according to the background art, a plurality of types of three-dimensional lookup tables, which are created by external devices such as other image pickup apparatuses and personal computers, can be stored in the memory and selected therefrom.

However, it is necessary to create more three-dimensional lookup tables and record the created three-dimensional lookup tables in the memory in order to set a processing content of image processing more finely and change the same easily. Therefore, the man-hours, the memory capacity and the like required for doing the above have been problems.

Thus, an embodiment provides an image pickup apparatus including: a common processing unit including a fixed level signal generating unit configured to generate a fixed level signal that have discrete values in a color space and an address in association with each other and an image processing unit configured to perform image processing on the fixed level signal to generate grid data under the condition set by the user or the condition automatically set by the image pickup apparatus; and an individual processing unit including a three-dimensional lookup table storage unit configured to store a three-dimensional lookup table in which the address and the grid data are associated with each other and output the grid data corresponding to the address of an image pickup signal and an interpolation processing unit configured to perform interpolation processing using the grid data and the image pickup signal.

Further, the embodiment provides an image pickup method for the pickup apparatus including: generating a fixed level signal that have discrete values in a color space and an address in association with each other; performing image processing on the fixed level signal to generate grid data under the condition set by the user or the condition automatically set by the image pickup apparatus; storing a three dimensional-lookup table in which the address and the grid data are associated with each other; outputting the grid data corresponding to the address of an image pickup signal; and performing interpolation processing using the grid data and the image pickup signal.

According to the above embodiment, it is possible to provide an image pickup apparatus, an image pickup method, and an image pickup program capable of setting a processing content of image processing more finely and changing the same easily using a three-dimensional lookup table to reduce electric power consumption.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

The image pickup apparatus and the image pickup method according to this embodiment are hereinafter explained with reference to the drawings.

First, for facilitating understanding of the image pickup apparatus according to this embodiment, an image pickup apparatus that performs image processing without using a three-dimensional lookup table is briefly described as a reference example.

Figure 5:
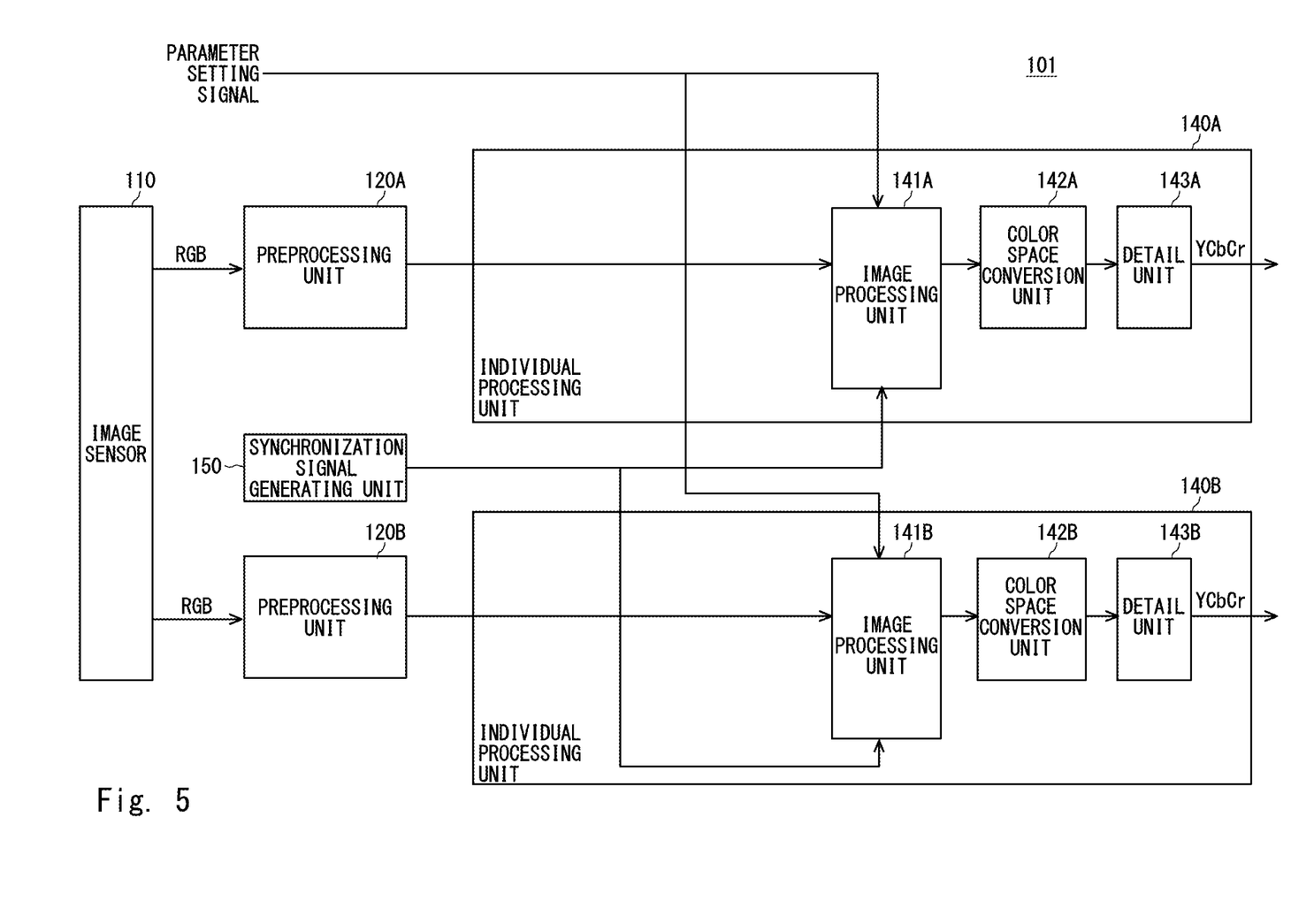
FIG. 5 is a block diagram showing a schematic configuration of an image pickup apparatus 101 according to a reference example.

FIG. 5 is a block diagram showing a schematic configuration of an image pickup apparatus 101 according to the reference example.

The image pickup apparatus 101 is, for example, a video camera, and includes an image sensor 110, preprocessing units 120A and 120B, individual processing units 140A and 140B, and a synchronization signal generating unit 150.

Note that "the preprocessing units 120A and 120B" may be collectively referred to as "the preprocessing unit 120" in the following explanation. The same applies to other configurations.

The image sensor 110 photographs a subject, generates an RGB image pickup signal, and outputs the generated image pickup signal to the preprocessing unit(s) 120A and/or 120B according to an image pickup region.

The preprocessing unit(s) 120A and/or 120B perform(s) preprocessing on the image pickup signal such as a black level adjustment and white balance correction and then output(s) the preprocessed image pickup signal to the individual processing unit(s) 140A and/or 140B.

The individual processing unit(s) 140A and/or 140B perform(s) image processing, a color space conversion, and the like on the preprocessed image pickup signal.

Note that the number of each of the preprocessing units 120 and the individual processing units 140 are not limited to two. The number thereof is four when the image is divided into four to perform processing and the number thereof is six when the image is divided into six to perform processing. When the image is not divided to perform processing, one preprocessing unit 120 and one individual processing unit 140 are merely required.

The synchronization signal generating unit 150 generates a synchronization signal and inputs the generated synchronization signal to the individual processing unit(s) 140A and/or 140B.

Further, the individual processing units 140A and 140B include the image processing units 141A and 141B, color space conversion units 142A and 142B, and detail units 143A and 143B, respectively, for performing the image processing, the color space conversion, and the like as described above.

Each of the image processing unit 141A and 141B includes respective circuits for performing color matrix processing, gamma correction, knee correction, black gamma correction, pedestal clamping, skin color correction, color space conversion, color gain adjustment, tone mapping and the like. Further, the image processing units 141A and 141B perform the image processing on the preprocessed image pickup signals and output the image-processed pickup signals to the color space conversion units 142A and 142B, respectively.

Note that the image processing unit 141 changes each parameter of the image processing when a user sets a condition of the image processing in accordance with the displayed menu on the operation screen or the image pickup apparatus 101 automatically sets conditions of exposure and white balance (or performs automatic control).

The color space conversion units 142A and 142B convert the image-processed image pickup signals from an RGB color space to a YCrCb color space and output the converted signals to the detail units 143A and 143B, respectively.

The detail units 143A and 143B adjust the sharpness of the color-space converted image pickup signals and output the adjusted signals to an image storage unit, an image display unit (neither are shown), and so on.

Note that the preprocessing units 120 and the individual processing units 140 are in operation at all times during a video active period.

Further, the image processing unit 141 is composed of the plurality of circuits as described above and hence includes many gates. Further, the image processing unit 141 requires a large amount of electric power in order to perform processing for each pixel of image data. In particular, in an image pickup apparatus with a large number of pixels referred to as 4K, 8K or the like, the processing speed of each device thereof is smaller than the required processing speed. Therefore, parallel processing is required to be performed using a plurality of preprocessing units 120 and a plurality of individual processing units 140, and the electric power for the parallel processing is thus required.

Accordingly, in the image pickup apparatus 101 according to the reference example, there has been a problem that a plurality of large circuits are required and a large amount of electric power is thus required for image processing.

Next, an image pickup apparatus according to this embodiment by which the above problem can be solved is described.

Figure 1:
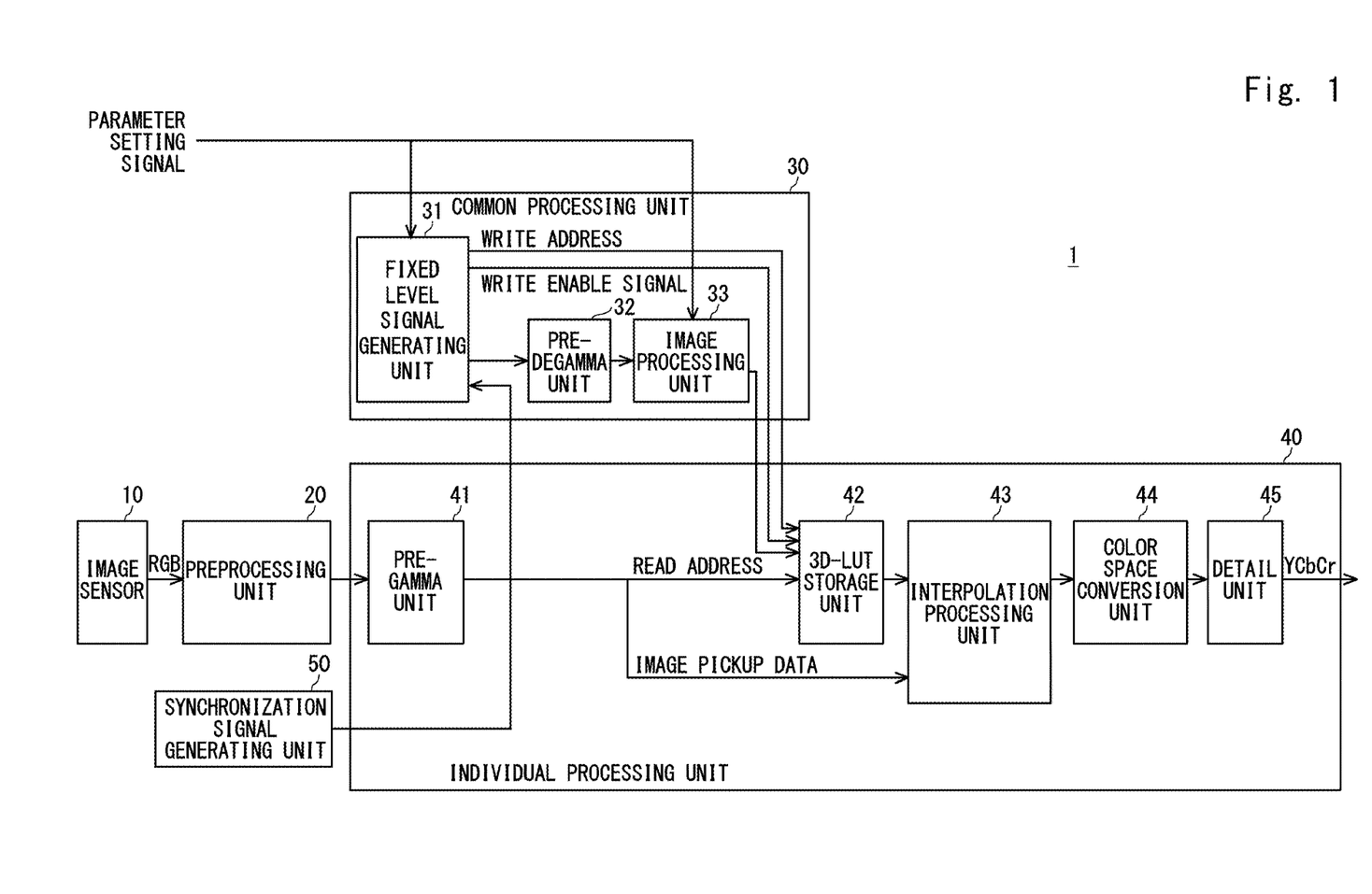
FIG. 1 is a block diagram showing a schematic configuration of an image pickup apparatus 1 according to an embodiment.

FIG. 1 is a block diagram showing a schematic configuration of an image pickup apparatus 1 according to this embodiment.

The image pickup apparatus 1 is, for example, a video camera, and includes an image sensor 10, a preprocessing unit 20, a common processing unit 30, an individual processing unit 40, and a synchronization signal generating unit 50.

The image sensor 10 and the preprocessing unit 20 may be the same as the image sensor 110 and the preprocessing unit 120 of the image pickup apparatus 101 according to the reference example, and thus the explanation thereof is omitted.

In a vertical blanking period, the common processing unit 30 generates a fixed level signal which has discrete values in a color space, performs image processing on the generated fixed level signal under the condition set by a user or the condition automatically set by the image pickup apparatus 1, and outputs the image-processed fixed level signal to the individual processing unit 40.

The individual processing unit 40 stores the image-processed fixed level signal in a three-dimensional lookup table and performs interpolation processing on the image pickup signal in a video active period referring to that three-dimensional lookup table. The video equivalent to that obtained by the individual processing unit 140 according to the reference example is thereby obtained.

Note that at least one of each of the preprocessing units 20 and the individual processing units 40 is provided according to the number of divisions of the image (the number of the image blocks) in the same manner as that of the image pickup apparatus 101 according to the reference example.

Figure 2:
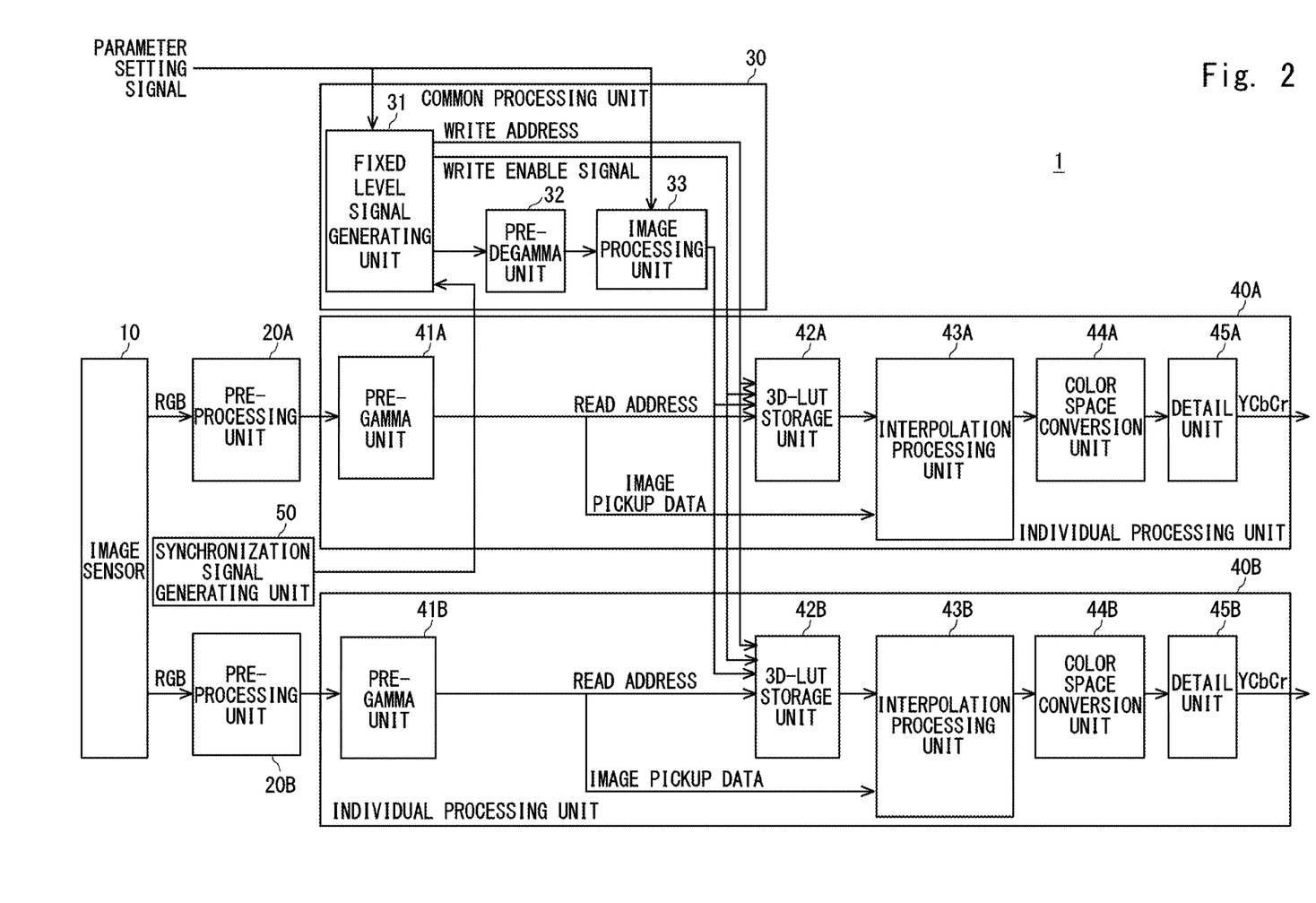
FIG. 2 is another block diagram showing a schematic configuration of the image pickup apparatus 1 according to the embodiment.

FIG. 2 is another block diagram showing a schematic configuration of the image pickup apparatus 1 according to this embodiment. Preprocessing units 20A and 20B, and individual processing units 40A and 40B are provided as shown in FIG. 2.

The synchronization signal generating unit 50 generates a synchronization signal and outputs the generated synchronization signal to the common processing unit 30.

Further, the common processing unit 30 includes a fixed level signal generating unit 31, a pre-degamma unit 32, and an image processing unit 33 in order to generate a fixed level signal and perform the image processing on the fixed level signal as described above.

The fixed level signal generating unit 31 generates a fixed level signal and a write address in association with each other in a vertical blanking period in response to a parameter setting signal indicating that a user or the image pickup apparatus 1 has set the image processing condition. Further, the fixed level signal generating unit 31 outputs the fixed level signal and the write address to the pre-degamma unit 32 and the individual processing unit 40, respectively.

Figure 3:
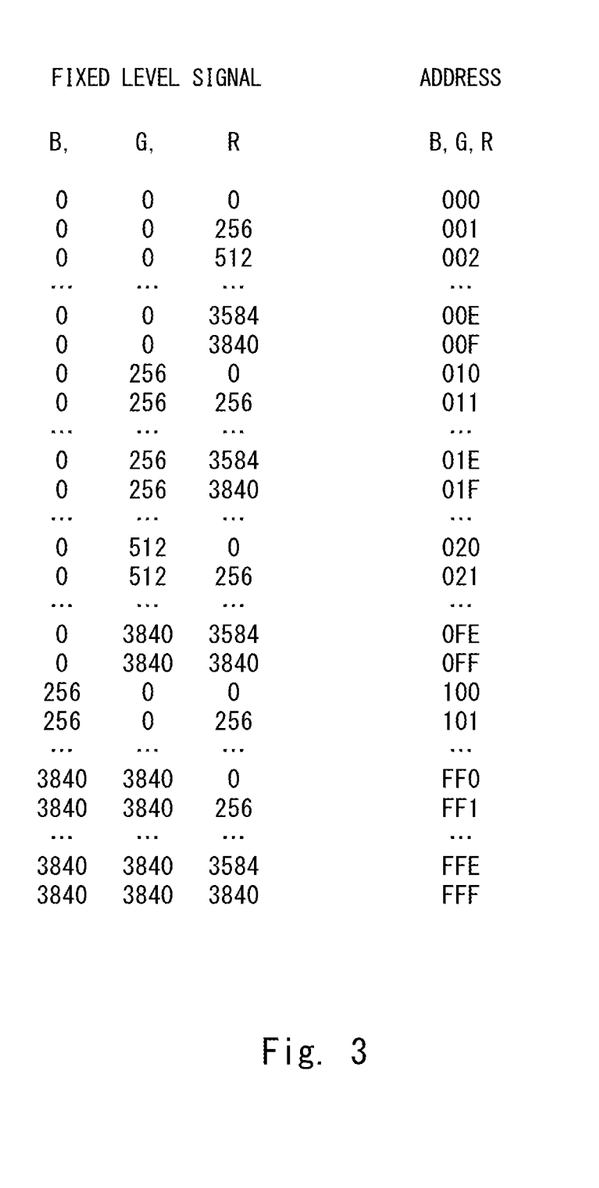
FIG. 3 is an example of a fixed level signal and a write address according to the embodiment.

FIG. 3 is an example of a fixed level signal and a write address according to this embodiment. In FIG. 3, the fixed level signal is shown on the left and the write address is shown on the right.

For example, when a three-dimensional lookup table of a 16×16×16 grids (lattice points) is stored in the individual processing unit 40 on the condition that the input values R, G, and B of image processing are respectively 12 bits and the maximum values of R, G, and B are respectively 3840, the fixed level signal generating unit 31 generates the fixed level signal in which the respective intervals between each of the values R, G, and B are 256, which is a value obtained by dividing 3840 by (16−1=) 15 as shown in FIG. 3.

At this time, for example, the fixed level signal generating unit 31 generates the fixed level signal of (B, G, R)=(0, 0, 0) and the write address of (B, G, R)=(0, 0, 0) in association with each other at a first clock, and generates the fixed level signal of (B, G, R)=(0, 0, 256) by increasing the value R by 256 and the write address of (B, G, R)=(0, 0, 1) by increasing the value R by one in association with each other at the next clock.

The fixed level signals and the write addresses to be generated by the fixed level signal generation unit 31 at the subsequent clocks are as shown in FIG. 3. Further, the fixed level signal generating unit 31 generates the fixed level signal of (B, G, R)=(3840, 3840, 3840) and the write address of (B, G, R)=(F, F, F) in association with each other at the (16×16×16=) 4096th clock, and generates the fixed level signal and the write address of all combinations of values R, G, and B.

Note that in a HD (High Definition) video, the 4096th clock corresponds to approximately two lines, and the fixed level signal and the write address in all combinations of the above values R, G, and B can be generated in the vertical blanking period.

Further, the fixed level signal generating unit 31 outputs a write enable signal to the individual processing unit 40 in the same vertical blanking period as that in which the fixed level signal and the write address in all combinations of the above values R, G and B can be generated.

Further, the fixed level signal generating unit 31 can arbitrarily set the respective intervals between each of the values R, G, and B of the fixed level signal, and can set each of the values R, G, and B of the fixed level signal at any value.

The pre-degamma unit 32 performs degamma correction on the fixed level signal and outputs the degamma-corrected fixed level signal to the image processing unit 33. In this manner, the image-processed fixed level signal output from the image processing unit 33 has discrete values without being biased in the color space.

The image processing unit 33 includes an image processing circuit equivalent to that of the image processing unit 141 according to the reference example, inputs a parameter setting signal indicating that a user or the image pickup apparatus 1 has set the image processing condition thereto, and the image processing unit 33 performs the image processing on the degamma-corrected fixed level signal under the said processing condition and outputs the image-processed fixed signal to the individual processing unit 40 in the vertical blanking period. The image-processed fixed level signal becomes grid data constituting each grid of the three-dimensional lookup table as described later.

Further, the individual processing unit 40 includes a pre-gamma unit 41, a three-dimensional lookup table storage unit (3D-LUT storage unit) 42, an interpolation processing unit 43, a color space conversion unit 44, and a detail unit 45 in order to store and refer to the three-dimensional lookup table and perform interpolation processing on the image pickup signal as described above.

The pre-gamma unit 41 performs gamma correction on the preprocessed image pickup signal input from the pre-processing unit 20 and outputs the gamma-corrected image pickup signal. This gamma correction is performed in advance so that the interpolation processing unit 43 cancels out the effect of the degamma correction performed by the pre-degamma unit 32.

Further, the upper four bits of the gamma-corrected image signal are a read address given to each image pickup signal in the same manner as the above-described write address, and the pre-gamma unit 41 outputs the read address as a read address signal to the three-dimensional lookup table storage unit 42. Further, the pre-gamma unit 41 outputs the lower eight bits of the image data of the gamma-corrected image pickup signal to the interpolation processing unit 43.

The three-dimensional lookup table storage unit 42 stores the image-processed fixed level signal input from the image processing unit 33 as grid data in association with the write address of the write address signal directly input from the fixed level signal generating unit 31.

Then, the three-dimensional lookup table storage unit 42 inputs the read address of the upper four bits of the gamma-corrected image pickup signal thereto, and thereby outputs the grid data corresponding to the read address required for the interpolation processing unit 43.

The interpolation processing unit 43 uses the grid data input from the three-dimensional lookup table storage unit 42 and the gamma-corrected image data to perform interpolation processing, and outputs the interpolated data to the color space conversion unit 44. In this manner, the interpolation processing unit 43 can output video data equivalent to that obtained by the image processing unit 141 according to the reference example by performing image processing in accordance with the image processing performed by the image processing unit 33.

Note that the interpolation processing performed by the interpolation processing unit 43 may be well-known interpolation processing of a three-dimensional lookup table.

Further, the color space conversion unit 44 and the detail unit 45 may be the same as the color space conversion unit 142 and the detail unit 143 of the image pickup apparatus 101 according to the reference example, and the explanation is thus omitted.

Note that the components to be achieved by the image pickup apparatus 1 can be achieved, for example, by executing a program under the control of an arithmetic device (not shown) included in the image pickup apparatus 1.

More specifically, the image pickup apparatus 1 is achieved by loading a program stored in a storage unit (not shown) in a main storage device (not shown) to execute the program under the control of the arithmetic device.

Further, the components are not limited to being achieved by software executed by a program, but may be achieved by any combination of hardware, firmware, and software.

The above-described program can be stored and provided to the image pickup apparatus 1 using any type of non-transitory computer readable media. Non-transitory computer readable media include any type of tangible storage media.

Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.).

Further, the program may be provided to the image pickup apparatus 1 using any type of transitory computer readable media. Examples of transitory computer readable media include electric signals, optical signals, and electromagnetic waves. Transitory computer readable media can provide the program to the image pickup apparatus 1 via a wired communication line (e.g., electric wires, and optical fibers) or a wireless communication line.

Next, an operation of the image pickup apparatus 1 according to this embodiment, that is, an image pickup method is briefly described.

Figure 4:
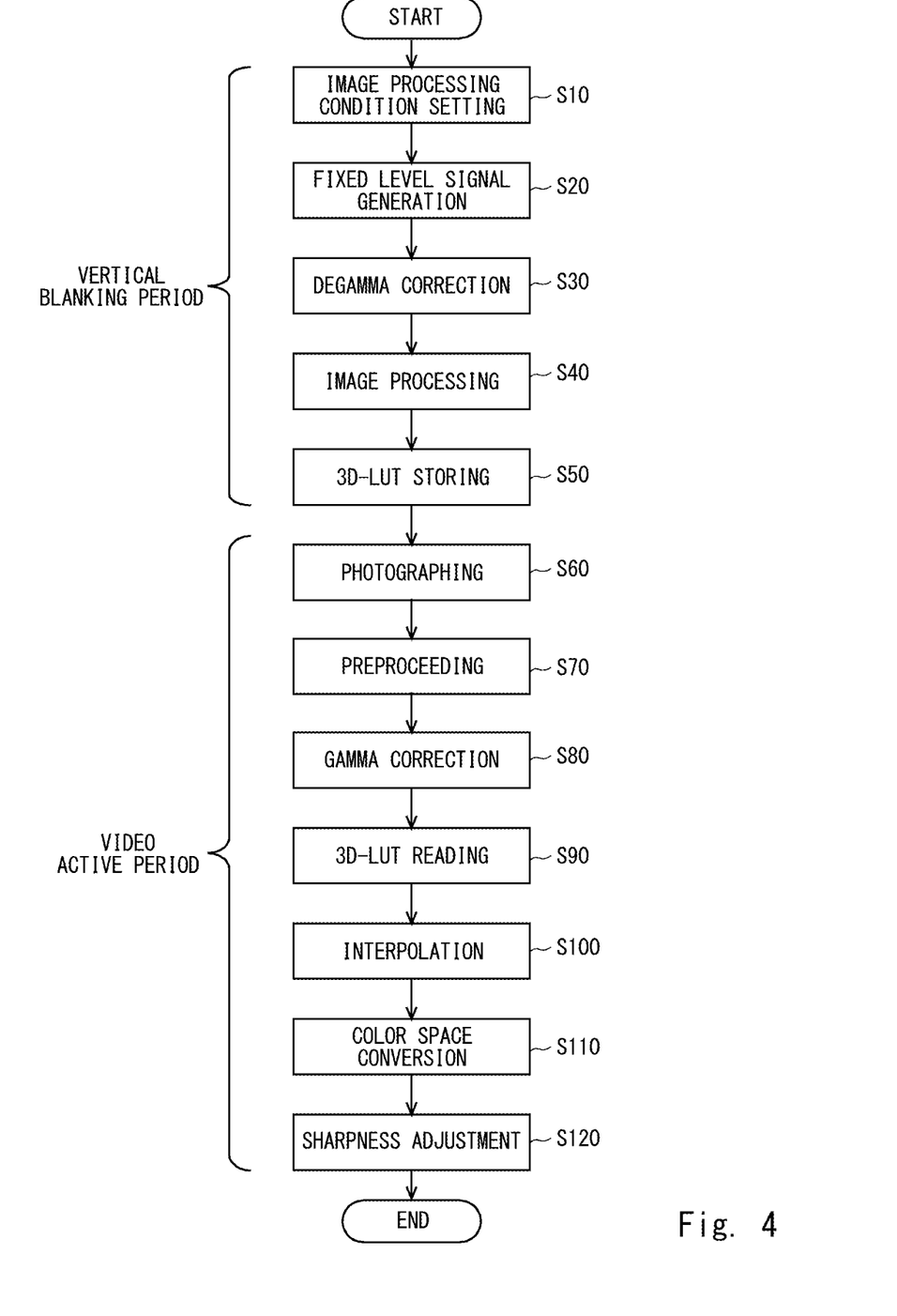
FIG. 4 is a flowchart showing a process procedure for an image pickup method according to the embodiment.

FIG. 4 is a flowchart showing a process procedure for the image pickup method according to this embodiment.

After the image pickup apparatus 1 starts operating, when a user sets or changes the condition of the image processing in accordance with the displayed menu on the operation screen or the image pickup apparatus 101 automatically sets or changes the conditions of exposure and white balance (step S10), the fixed level signal generating unit 31 inputs a parameter setting signal and a synchronization signal transmitted from the synchronization signal generating unit 50 thereto and then generates the fixed level signal and the write address in association with each other in the vertical blanking period (step S20).

Next, the pre-degamma unit 32 performs degamma correction on the fixed level signal (step S30).

Next, the image processing unit 33 performs the image processing such as color matrix processing and gamma correction on the degamma-corrected fixed level signal according to the condition set by the parameter setting signal to generate grid data of a three-dimensional lookup table (step S40).

Next, the three-dimensional lookup table storage unit 42 stores the address generated by the fixed level signal generating unit 31 and the grid data generated by the image processing unit 33 in association with each other in the three-dimensional lookup table (step S50).

Note that the common processing unit 30 performs the processes in the steps S20 to S50 in the same vertical blanking period. The common processing unit 30 temporarily stops the operation when the vertical blanking period is over.

When a video active period starts, the image sensor 10 photographs a subject and generates an image pickup signal (step S60).

Next, the preprocessing unit 20 performs preprocessing on the image pickup signal such as a black level adjustment (step S70). When a plurality of preprocessing units 20 and individual processing units 40 are provided, they perform parallel processing for the processes performed after the step S70.

Next, the pre-gamma unit 41 performs gamma correction on the preprocessed image pickup signal (step S80).

Next, the three-dimensional lookup table storage unit 42 outputs the grid data corresponding to the read address which sets the upper four bits of the image signal as an address (step S90).

Next, the interpolation processing unit 43 uses the grid data and the gamma-corrected image pickup signal to perform interpolation processing (step S100).

Next, the color space conversion unit 44 converts the interpolated signal from the RGB signal to the YCbCr signal (step S110).

Lastly, the detail unit 45 performs a sharpness adjustment on the signal after the color space conversion, and outputs the adjusted signal (step S120).

In the image pickup apparatus 1 and the image pickup method according to this embodiment, the common processing unit 30 can generate each of the grid data of the three-dimensional lookup table by performing the image processing on the fixed level signal under the condition set by a user or the condition automatically set by the image pickup apparatus in the vertical blanking period, and at least one individual processing unit 40 can perform the image processing on the image pickup signal using the said three-dimensional lookup table in the video active period.

That is, the processing content of the image processing can be set more finely and the same easily changed by generating a three-dimensional lookup table used for image processing inside the image pickup apparatus 1.

Further, since the image processing unit 33 which generates each of the grid data of the three-dimensional lookup table operates only in the vertical blanking period, the operation time thereof is short. Accordingly, electric power consumption for the image processing can be reduced.

Further, there is no need to provide the image processing unit (image processing circuit) 33 in the individual processing unit 40, and a circuit size of the individual processing unit 40 or an area of a chip including the individual processing unit 40 can be decreased. Therefore, electric power consumption for the image processing can be further reduced.

Note that various additions and modifications can be made to the image pickup apparatus 1 or the image pickup method according to this embodiment.

For example, in this embodiment, the image pickup apparatus 1 is a video camera and performs the image processing on a video (a moving image). However, the image pickup apparatus 1 may be a digital camera and perform the image processing on a still image. In this case, it is not limited to a vertical blanking period in which the fixed level signal generating unit generates the fixed level signal and the image processing unit performs the image processing.

Further, in the image pickup apparatus 1, a configuration for performing image processing on the image pickup signal in the image processing unit 33, that is, a signal path such that the image processing unit 33 performs image processing on the image pickup signal preprocessed in the preprocessing unit 20 and the color space conversion unit 44 performs color conversion on the image-processed signal, may be further provided. With this configuration, a user can select the image-processed output image or the interpolated output image.

Further, a signal path such that the processes performed by the pre-degamma unit 32 and the pre-gamma unit 41 according to this embodiment are omitted may be further provided.

Further, the image pickup apparatus 1 and the image pickup method according to this embodiment may be configured as, for example, an image processing apparatus and an image processing method.

As described above, an image pickup apparatus 1 according to this embodiment includes: a common processing unit 30 including a fixed level signal generating unit 31 configured to generate a fixed level signal that have discrete values in a color space and an address in association with each otherand an image processing unit 33 configured to perform image processing on the fixed level signal to generate grid data under the condition set by the user or the condition automatically set by the image pickup apparatus; and an individual processing unit 40 including a three-dimensional lookup table storage unit 42 configured to store a three-dimensional lookup table in which the address and the grid data are associated with each other and output the grid data corresponding to the address of an image pickup signal and an interpolation processing unit 43 configured to perform interpolation processing using the grid data and the image pickup signal.

Further, in the image pickup apparatus 1 according to this embodiment, it is preferred that the fixed level signal generating unit 31 generate a fixed level signal and an address and the image processing unit 33 perform the image processing in the same vertical blanking period after the user or the image pickup apparatus sets the condition, and the interpolation processing unit 43 perform interpolation processing in a video active period.

Further, in the image pickup apparatus 1 according to this embodiment, it is preferred that the common processing unit 30 further include the pre-degamma unit 32, which performs degamma correction on the fixed level signal, between the fixed level signal generating unit 31 and the image processing unit 33, and the individual processing unit 40 further include the pre-gamma unit 41 that performs gamma correction on the image pickup signal.

Further, it is preferred that the image pickup apparatus 1 according to this embodiment include a plurality of individual processing units 40, and the three-dimensional lookup table storage units 42 included therein store the same three-dimensional lookup table.

Further, an image pickup method according to this embodiment includes: a step S20 of generating a fixed level signal that have discrete values in a color space and an address in association with each other; a step S40 of performing image processing on the fixed level signal to generate grid data under the condition set by the user or the condition automatically set by the image pickup apparatus; a step S50 of storing a three dimensional-lookup table in which the address and the grid data are associated with each other; a step S90 of outputting the grid data corresponding to the address of an image pickup signal; and a step S100 of performing interpolation processing using the grid data and the image pickup signal.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A moving image pickup apparatus, comprising:
    a common processing unit comprising:
        a fixed level signal generating unit configured to generate a fixed level signal that have discrete values in a color space and an address in association with each other; and
        an image processing unit configured to perform image processing on the fixed level signal to generate grid data under a condition set by a user or a condition automatically set by the image pickup apparatus; and
    an individual processing unit comprising:
        a three-dimensional lookup table storage unit configured to store a three-dimensional lookup table in which the address and the grid data are associated with each other and output the grid data corresponding to an address of an image pickup signal; and
        an interpolation processing unit configured to perform interpolation processing using the grid data and the image pickup signal,
    wherein
    when the three-dimensional lookup table of N×N×N grids is stored in the individual processing unit, the fixed level signal generating unit generates the fixed level signal in which the respective intervals between each of the values R, G, and B of the fixed level signal become a value obtained by dividing the maximum value of the values R, G, and B by N−1,
    the fixed level signal generating unit performs the following processing of:
        generating, first, the fixed level signal of values (B, G, R)=(0, 0, 0) and an address of (B, G, R)=(0, 0, 0) in association with each other,
        then generating the fixed level signal in which each of the values B, G, and R is increased by the intervals and the address in which the corresponding values of B, G, and R are increased by one in association with each other, and
        repeating the generation of the fixed level signal and address, thereby generating the fixed level signal and the address of all combinations of values R, G, and B.

2. The moving image pickup apparatus according to claim 1, wherein
    the fixed level signal generating unit generates a fixed level signal and an address and the image processing unit performs the image processing in the same vertical blanking period after the user or the image pickup apparatus sets the condition, and
    the interpolation processing unit performs interpolation processing in a video active period.

3. The moving image pickup apparatus according to claim 1, wherein
    the common processing unit further includes a pre-degamma unit between the fixed level signal generating unit and the image processing unit, the pre-degamma unit performing degamma correction on the fixed level signal, and
    the individual processing unit further includes a pre-gamma unit that performs gamma correction on the image pickup signal.

4. The moving image pickup apparatus according to claim 1, comprising a plurality of the individual processing units, wherein
    the three-dimensional lookup table storage units of the plurality of the individual processing units store the same three-dimensional lookup table.

5. A moving image pickup method, comprising:
    generating a fixed level signal that have discrete values in a color space and an address in association with each other;
    performing image processing on the fixed level signal to generate grid data under the condition set by the user or the condition automatically set by the image pickup apparatus;
    storing a three dimensional-lookup table in which the address and the grid data are associated with each other;
    outputting the grid data corresponding to an address of an image pickup signal; and
    performing interpolation processing using the grid data and the image pickup signal,
    wherein
    when the three-dimensional lookup table of N×N×N grids is stored, the fixed level signal in which the respective intervals between each of the values R, G, and B of the fixed level signal become a value obtained by dividing the maximum value of the values R, G, and B by N−1 is generated,
    the fixed level signal of values (B, G, R)=(0, 0, 0) and an address of (B, G, R)=(0, 0, 0) are generated first in association with each other,
    then the fixed level signal in which each of the values B, G, and R is increased by the intervals and the address in which the corresponding values of B, G, and R are increased by one are then generated in association with each other, and the generation of the fixed level signal and address is repeated, thereby generating the fixed level signal and the address of all combinations of values R, G, and B.

6. Non-transitory computer readable medium storing a moving image pickup program causing an image pickup apparatus to:

generate a fixed level signal that have discrete values in a color space and an address in association with each other;

perform image processing on the fixed level signal to generate grid data under the condition set by the user or the condition automatically set by the image pickup apparatus;

store a three dimensional-lookup table in which the address and the grid data are associated with each other;

output the grid data corresponding to the address of an image pickup signal; and perform interpolation processing using the grid data and the image pickup signal wherein when the three-dimensional lookup table of N×N×N grids is stored, the fixed level signal in which the respective intervals between each of the values R, G, and B of the fixed level signal become a value obtained by dividing the maximum value of the values R, G, and B by N−1 is generated, the fixed level signal of values (B, G, R)=(0, 0, 0) and an address of (B, G, R)=(0, 0, 0) are generated first in association with each other, then the fixed level signal in which each of the values B, G, and R is increased by the intervals and the address in which the corresponding values of B, G, and R are increased by one are then generated in association with each other, and the generation of the fixed level signal and address is repeated, thereby generating the fixed level signal and the address of all combinations of values R, G, and B.

7. The moving image pickup apparatus according to claim 2, wherein the fixed level signal generating unit generates the fixed level signal in a time corresponding to two lines of the horizontal line scanning time during the vertical blanking period.

* * * * *